United States Patent
Speck et al.

(10) Patent No.: US 11,048,328 B2
(45) Date of Patent: Jun. 29, 2021

(54) METHOD AND FINGER-WORN DEVICE FOR CONTROLLING AN EXTERNAL COMPUTER

(71) Applicant: PADRONE AG, Cham (CH)

(72) Inventors: Marc Speck, Zug (CH); Thomas Stauffer, Lucerne (CH)

(73) Assignee: PADRONE AG, Cham (CH)

( * ) Notice: Subject to any disclaimer, the term of this patent is extended or adjusted under 35 U.S.C. 154(b) by 0 days.

(21) Appl. No.: 16/982,604

(22) PCT Filed: Mar. 19, 2019

(86) PCT No.: PCT/EP2019/056868
§ 371 (c)(1),
(2) Date: Sep. 21, 2020

(87) PCT Pub. No.: WO2019/180034
PCT Pub. Date: Sep. 26, 2019

(65) Prior Publication Data
US 2021/0018980 A1    Jan. 21, 2021

(30) Foreign Application Priority Data
Mar. 19, 2018   (EP) ..................................... 18162633

(51) Int. Cl.
*G06F 3/01* (2006.01)
*G01S 17/894* (2020.01)
(Continued)

(52) U.S. Cl.
CPC .............. *G06F 3/014* (2013.01); *G01S 17/42* (2013.01); *G01S 17/894* (2020.01); *G06F 3/017* (2013.01);
(Continued)

(58) Field of Classification Search
None
See application file for complete search history.

(56) References Cited

U.S. PATENT DOCUMENTS

9,582,076 B2 *   2/2017   Kienzle .................... G06F 3/014
2017/0205879 A1 *  7/2017   Joseph ................ G06F 3/03544
(Continued)

*Primary Examiner* — Duane N Taylor, Jr.
(74) *Attorney, Agent, or Firm* — JMB Davis Ben-David (57) ABSTRACT

The invention relates to a method and a computer program for wireless interactions with an external computer with a finger-worn device configured to acquire and transmit position data of at least one finger relative to an object surface to an external computer, wherein the method comprises the steps of:
  acquiring (300, 301) sensor data (201, 202) from a first sensor system (9) and a second sensor system (10) comprised in the device (1);
  estimating (302) a position and/or an orientation of at least one finger (2) with respect to an object surface (7) from the sensor data (201, 202), wherein the estimation (302) of the position and/or the orientation of the at least one finger (2) with respect to the object surface (7) is performed by a machine learning method (100) executed on a processor (4) comprised by the device (1);
  wirelessly transmitting (304) position data (203) comprising the estimated position and/or orientation of the at least one finger (2) with respect to the subject surface (7) to an external computer (15);
  relating (305) the estimated position and/or orientation of the at least one finger (2) with respect to the object surface (7) comprised in the position data (203) to a display position and/or a display orientation (204) in a coordinate system of a display (18);
  indicating the display position and/or the display orientation (204) on the display (18).

(Continued)

The invention furthermore relates to a device (1) for executing the method according to the invention.

15 Claims, 2 Drawing Sheets

(51) Int. Cl.
    *G01S 17/42*     (2006.01)
    *G06F 3/03*     (2006.01)
    *G06F 3/0346*     (2013.01)

(52) U.S. Cl.
    CPC .......... *G06F 3/0304* (2013.01); *G06F 3/0346* (2013.01); *G06F 2203/0331* (2013.01)

(56) References Cited

U.S. PATENT DOCUMENTS

| | | |
|---|---|---|
| 2017/0315620 A1 | 11/2017 | Johri |
| 2018/0024641 A1 | 1/2018 | Mao |
| 2018/0307320 A1* | 10/2018 | Ananthapur Bache ..................... G06F 3/0346 |

\* cited by examiner

METHOD AND FINGER-WORN DEVICE FOR CONTROLLING AN EXTERNAL COMPUTER

CROSS-REFERENCE TO RELATED APPLICATIONS

This is the US National Stage of International Patent Application No. PCT/EP2019/056868, filed Mar. 19, 2019, which in turn claims the benefit of European Patent Application No. 18162633.4, filed Mar. 19, 2018.

The invention relates to a method for controlling an external computer with a finger-worn device, and a device that is configured to execute the method.

Methods for controlling an external computer with a finger-worn device are known in the state of the art.

The objective of finger-worn devices is to determine the position and orientation of at least one finger of the user's hand with respect to its surrounding space.

Finger-worn devices such as a ring can be for example tracked by an external tracking device in order to determine a position and/or an orientation of such a device in space.

Such finger-worn devices transmit some sensor data, such as sensor data from an integrated camera to an external computer in order to further process the recorded sensor data.

This however requires a comparably high bandwidth for data transmission to the external computer and might cause a considerable time lag between a movement of the device by the user and the estimated feedback on the external computer, requiring more energy and additional infrastructure.

On the other hand, the estimation of the position and orientation of fingers in space is comparably energy-consuming as conventional algorithms require powerful processors in order to provide an instant feedback.

Therefore, the estimation of the position and/or orientation of the finger is typically done with external devices, e.g. by recording and evaluating images of the finger in order to estimate its pose. External estimation however lacks precision in terms of the estimated position and/or orientation.

When exploiting finger-worn devices for estimation of position and/or orientation, another problem in the state of the art is that the cameras, particularly the lenses of the cameras oftentimes require too much space so that the finger-worn device becomes comparably bulky.

Furthermore, it turns out that a natural feeling in terms of control of for example a pointer or cursor on a display with such a device is particularly evoked, when a movement of the device is related to a relative motion with respect to a surface under the hand wearing the device. Such a surface can for example be a tabletop or a body part of the user wearing the finger-worn device.

Therefore the objective of the invention is to provide a method and a device that allows for comfortable and instant controlling of an external computer with the fingers.

This objective is achieved by a method according to claim 1.

Advantageous embodiments are described in the subclaims.

According to claim 1 a method for wireless interactions between an external computer and a finger-worn device comprises at least the following steps, wherein the device is adapted and configured to acquire and transmit position data of at least one finger relative to an object surface to an external computer:

particularly activating the device, for example with a predefined finger motion;
particularly wirelessly connecting the device with an external computer such as to establish a data connection;
acquiring, and particularly recording sensor data from a first sensor system and a second sensor system comprised by the device, particularly wherein the sensor data comprise an object surface as well as at least one finger or a portion of the at least one finger, particularly of the finger wearing the device;
estimating a position and/or an orientation of the at least one finger of a hand of a person wearing the device with respect to the object surface from the sensor data, wherein the estimation of the position and/or the orientation of the at least one finger with respect to the object surface is performed by a machine learning method executed on a processor comprised by and particularly arranged and housed in the device;
wirelessly transmitting position data comprising the estimated position and/or the estimated orientation of the at least one finger with respect to the object subject surface to an external computer;
relating the estimated position and/or the estimated orientation of the at least one finger with respect to the object surface to a display position and/or a display orientation in a coordinate system of a display;
indicating the display position and/or the display orientation on the display.

With the method according to the invention, the external computer can be controlled by moving the at least one finger.

The required bandwidth for the data connection between the external computer and the device is significantly reduced as the sensor data, e.g. images do not need to be transmitted via this connection but only the position data that require less bandwidth.

The term "external computer" refers to a computer that is not attached or in physical contact with the device.

Similarly, the term "external" refers to an object, device or a method that is arranged or executed outside the device according to the invention, i.e. without being in physical contact with the device.

The method according to the invention allows for reliable estimation of the position and/or the orientation of the at least one finger, as the first and second sensor system is arranged directly on the device and thus occlusions of the at least one finger are reduced to a great extent.

For better intelligibility, in the following the term "at least one finger" always refers to at least a portion of the at least one finger, i.e. it is not necessary to record, estimate and otherwise process the whole finger, but it is sufficient to process only a portion of the at least one finger, particularly a fingertip portion of the at least one finger. The same applies to the case when it is referred to a plurality of fingers or the hand.

The interaction with the external computer and the device is for example facilitated by hand and finger gestures performed by a user of the device, such as moving a cursor, selecting or manipulating virtual objects displayed on the display particularly by means of interactive display objects.

The term "user", "user of the device" or similar expressions particularly refer to the person wearing the device.

From the estimated position and/or orientation for example a broad variety of commands can be transmitted to the external computer. Interactions with the external computer are for example facilitated by means of commands given or fed back via virtual display objects on the display.

Such commands can comprise for example clicking on a virtual object or inputting alpha-numeric characters. The feedback is most often an optical feedback displayed on the screen, the indication of the display position and/or the display orientation on the display is thus an essential feature in interfacing the external computer.

The method allows for a natural interfacing and controlling of the external computer or any connected device such as a display, as the position and/or orientation of the at least one finger is estimated with respect to the object surface and thus the indication of the display position and/or the display orientation is related to the position and/or orientation of the at least one finger with respect to the object surface.

Relating the position and/or orientation of the at least one finger to the display position and/or the display orientation particularly comprises the mapping of the estimated position and/or orientation of the at least one finger to a virtual surface of the display frame of reference, e.g. to a display coordinate system.

The natural "feel" of a control that relates a position relative to the object surface to the display position and/or the display orientation is due to the human perception that promptly relates a hand or a finger movement to a surface in the proximity of the hand or the finger, particularly when said object surface is touched with the hand or the finger.

The object surface can be a physical object surface, such as a tabletop or a body part, such as a thigh of the person using the device.

According to another embodiment of the invention, the object surface is displayed on the display such that an associated virtual object surface is displayed.

The virtual object surface can have a different look and shape. Furthermore, additional virtual objects can be arranged on the virtual object surface, wherein it is particularly possible to interact with said virtual objects by means of the device and the estimation of the position and/or orientation of the at least one finger.

The display of the virtual object surface can for example be comprised in an augmented or virtual reality device, such as virtual or augmented reality glasses.

According to another embodiment of the invention, the virtual object surface is mapped to the object surface, particularly to a portion of the object surface located under the hand wearing the device particularly with a non-linear transformation of the respective associated coordinate systems of the virtual object surface and the object surface.

According to another embodiment of the invention, a virtual object or a portion of the virtual object is mapped to the object surface (and vice versa) such that the estimated position and/or orientation of the at least one finger is mapped to the virtual object displayed on the display.

For example, if a virtual object with a curved surface is displayed in augmented reality glasses, the curved surface of the virtual object visible to the person wearing the glasses can be mapped to the object surface even though the object surface might be planar or otherwise curved. The origin of such a virtual surface (of the virtual object) can be determined by the external computer and not necessarily by e.g. a first touch point of the at least one finger on the object surface.

Furthermore, the particularly three-dimensional position and/or orientation of the at least one finger can be mapped to an associated position and/or orientation of the particularly three-dimensional virtual object.

The acquisition of sensor data from the two particularly distinct sensor systems, having distinct sensors allows for a separated acquisition of sensor data. The sensor data can be acquired for example along different directions and sectors from the first and second sensor system. For example, the first sensor system can record the at least one finger, while the second sensor system dedicatedly records the object surface.

Each of the two sensor systems is particularly configured to have a high precision such that a determination of the position and/or the orientation of the at least one finger can be performed with a precision particularly better than 1 mm, more particularly better than 0.1 mm.

A high precision in estimating the position and/or orientation of the at least one finger with respect to the object surface is imperative in order to provide an accurate control over the external computer and to resolve also comparably small movements of the at least one finger.

The acquired sensor data from the first and the second sensor system are provided to the machine learning method that is executed on a processor of the device.

This has the advantage that the machine learning method executes in real-time and provides the estimated position and/or orientation of the at least one finger with respect to the object surface to the external computer, which reduces the bandwidth of transmitted data.

According to an embodiment of the invention, the first sensor system acquires sensor data comprising the at least one finger, wherein the second sensor system acquires sensor data comprising particularly only the object surface.

According to another embodiment of the invention, the first optical sensor acquires sensor data from a first sensor field, particularly a first field of view and the second optical sensor system acquires sensor data from a second sensor field, particularly a second field of view.

The term "first sensor field" and "second sensor field" particularly refer to a solid angle, an area or a volume within which the corresponding sensor system is configured to acquire sensor data from.

According to another embodiment of the invention, the first and the second sensor field cover substantially different sensor fields, i.e. particularly a different solid angle, area or volume.

According to another embodiment of the invention, the first and the second sensor field are substantially non-overlapping.

According to another embodiment of the invention, the sensor data acquired from the second sensor system are particularly only used to determine a position and/or orientation of the device with respect to the object surface.

According to another embodiment of the invention, from the sensor data of the first sensor system a position and/or an orientation of the at least one finger relative to the device is estimated by the machine learning method, wherein from the sensor data from the second sensor system a position and/or an orientation of the device with respect to the object surface is estimated by the machine learning method. From these device-related positions and orientations, the position and/or the orientation of the at least one finger relative to the surface is determined, particularly with a spatial accuracy of more than 1 mm, particularly more than 0.5 mm, more particularly 0.1 mm.

The high accuracy allows for minute detection of finger movements of the hand wearing the device. This in turn allows for fine motor skills of the fingers to be used in human-machine interactions.

The sensor data can be pre-filtered or pre-processed prior to or after processing with the machine learning method. Pre-filtering can be done for example in terms of an edge filter for detecting edges in an optical image, or an antialiasing filter in case the first and/or the second sensor system are an optical sensor system. The at least one finger might exhibit a jitter, in particular when it does not touch an object and muscles are not relaxed. Such jitter can be filtered on the device or the external computer.

The term "machine learning method" as used in the art refers to a method that is particularly configured and adapted to learn a task without being explicitly programmed, or without having an a priori model or knowledge of the task to be learned.

Particularly due to the distributed processing and structurally enforced generalization of the problem, machine learning methods typically work well even in the presence of noise on the data or some fluctuation in the repeatability of the process producing the data.

The machine learning method is particularly characterized in that it is trained for the estimation of the position and/or the orientation of the at least one finger during a training step, where the machine learning method is trained by providing sensor data with known positions and/or orientations of the at least one finger and/or the object surface, such that the machine learning method progressively improves performance during training, without being explicitly programmed.

According to another embodiment of the invention, the machine learning method is a trained machine learning method.

The machine learning method adjusts its estimation capabilities during training particularly until no more improvement in its estimation accuracy is achieved.

The machine learning method particularly comprises a trained classifier or a plurality of trained classifiers.

The method according to the invention is particularly performed in real time, wherein particularly the estimation of the position and/or the orientation of the at least one finger by the machine learning method is processed in real time.

The term "real time" or "real time processing" particularly relates to the rapid handling of sensor data that is processed within milliseconds so that the determined position and/or orientation of the at least one finger is estimated by the machine learning method virtually immediately.

A data processing method is considered to be executed in real time if the method processes the input data as fast as new input data are provided to the method such that no discarding or excessive storing of input data becomes necessary eventually.

According to the invention the term real time therefore particularly refers to the situation that for each newly provided sensor data, the position and/or orientation of the at least one finger with respect to the object surface is estimated from the preceding sensor data.

The term "real time" particularly refers to a processing rate between 30 Hz to 240 Hz, i.e. the position and/or orientation of the at least one finger with respect to the object surface is estimated at a rate between 30 Hz and 240 Hz from the sensor data.

A processor in the context of the specification is a computerized device, such as a computer.

The processor comprises particularly an energy-conserving processor specialized for the efficient, i.e. rapid but energy-saving execution of the machine learning method.

Such a specialized processor particularly comprises a specific cache management or parallel calculation units that can be partially incorporated in the processor hardware. Processing units such as the calculation units are configured to access a common cache that is shared between several processing units. Those hardware features of the specialized processor are particularly optimized for neural network layers such as convolutions. For example, with regard to convolutions all weights remain in the cache and additionally all input data of a particular area.

The position of the at least one finger is particularly estimated three-dimensionally. The position particularly refers to a position of a portion or a fingertip of the at least one finger but can also include the 3-dimensional form of the at least one finger and/or the positions of the joints such as the distal interphalangeal joint or the proximal interphalangeal joint.

Alternatively or additionally, the orientation of the at least one finger is estimated three-dimensionally, i.e. particularly along three axes in space.

The orientation particularly refers to an orientation of a finger phalanx, particularly to the distal, the intermediate and/or the proximal phalanx. The orientation particularly refers to the orientation of the bones and/or the skin of the phalanx.

In case the positions and/or orientations of more than one finger are estimated by the machine learning method, the positions and/or orientations are estimated for each finger by the machine learning method.

The position data are wirelessly transmitted to the external computer. Additionally, the 3-dimensional shape of the object surface relative to the finger or discrete gestures can be transmitted. This shape is particularly only updated when the user moves to an area of the object surface that has not been recorded or when the object surface changes over time. To reduce latency and save energy, any data can be sent in an optionally lossy, compressed format. Instead of sending position data comprising the position and/or the orientation relative to an origin, a change in position and/or orientation can be comprised in the position data like computer mice do it for example. Further data that are particularly comprised in the position data can be transmitted. Such further data can for example comprise an information when the at least one finger touches the object surface or the positions of real objects such as a pencil or a keyboard.

Moreover, configuration data, such as predictive data, for the device can be transmitted from the external computer to the device. Suitable transmission protocols and technology can be used for this task, such as Bluetooth. To reduce the latency between a moving finger and the display of the movement of the finger on the display, e.g. by indication of the corresponding display position and/or the display orientation, the external computer can transmit information to the device about optimal timing of sending position data.

In order to relate the estimated position and/or orientation of the at least one finger to a coordinate system of the display, the estimated position and/or orientation is transformed from an device coordinate system that is for example attached to the device or to the object surface to a coordinate system of the display. The origin of the device coordinate system is particularly set at the touching point of the at least one finger on the object surface or alternatively to the location of the device when the device gets activated. The external computer can either autonomously adapt the origin, an orientation or a non-linear transformation of the device coordinate system and/or transmit this change to the device.

From the position and/or the orientation of the at least one finger at least a position but also an orientation or other characteristic features that are used for controlling the external computer is indicated on the display.

It is noted that even if both entities—the position and the orientation of the at least one finger—are estimated, it is possible to only indicate only one of these entities on the display, namely the display position or the display orientation.

An indication of the display position and/or the display orientation is for example the positioning and/or the orientation of a graphics object such as a cursor, or a deformation of a graphics object on the display. A three-dimensional position and/or orientation impression can be evoked graphically on the display.

The term "display" particularly refers to conventional computer displays, to displays comprised in augmented or virtual reality glasses as well as to 3D-displays that are arranged for three-dimensional display of objects. Such 3D-displays are for example used in augmented or virtual reality devices.

It is noted that the position and/or orientation of the at least one finger can comprise a plurality of positions and orientations such as for example the positions of the finger joints or the orientation of the finger bones. In case the position and/or orientation of the at least one finger comprises a plurality of positions and/or orientations, the display position and/or the display orientation can be derived in several ways suited for the specific task, i.e. the display position and/or the display orientation can comprise a plurality of positions and/or orientations and an appropriate indication is provided to the user, e.g. by displaying a finger oriented and positioned according to the position and orientation of the at least one finger, or the display position and/or the display orientation can be derived in another way, for example such that only one display coordinate and orientation of the indication on the display is generated and displayed.

From the estimated position and/or orientation of the at least one finger it is possible to derive the display position and/or the display orientation as well as the indication in a variety of ways.

When the sensor data indicate a particular object under the hand wearing the device such as a keyboard, the device can take actions such as stop sending position data to the external computer.

According to another embodiment of the invention, a skin and vein-pattern of the user is measured in order to activate the device.

This embodiment allows for a personalized use of the device, and can subsequently be used for authorization processes or for personalized gesture recognition.

According to another embodiment of the invention, sensor data from other sensors or sensor systems, particularly from external sensors are provided to the machine learning method particularly in order to determine the position and/or orientation of the at least one finger.

The external sensor system is for example a positioning system that is based on signal-transmission runtimes between the device and the external sensor system, like GPS.

According to another embodiment of the invention, the machine learning method permanently adapts its processing based on the provided sensor data.

According to another embodiment of the invention, the first sensor system is an optical sensor system that records optical sensor data, and/or wherein the second sensor system is an optical sensor system that records optical sensor data.

The optical sensor data are then the sensor data provided and processed further by the method.

The optical sensor system generates optical sensor data based on acquired light of the optical sensor system.

The optical sensor data can be acquired for example along different directions and sectors from the first and second optical sensor system. For example, the first optical sensor system records the at least one finger, while the second optical sensor system particularly dedicatedly records the object surface.

The acquisition of optical sensor data that provide a resolution and quality such that the intended high precision can be achieved is almost if not completely impossible with external optical sensors that are for example arranged externally of the device at a fixed position in space. Moreover, finger(s) that are visually occluded to the external optical sensor impair the reliable estimation of the position and/or orientation of the finger(s) by such an external system. Occlusion can occur for example due to the hand being partially in the line of sight of the external sensor or due to an object blocking the line of sight to the finger(s). Additionally, those external sensors need to be well positioned to cover the area of interaction, they can only cover a limited area of interaction and they do not follow the user when he uses different areas of interaction e.g. at another desk.

The optical sensor system that is arranged on the device solves this problem.

The machine learning method can be trained for the specific positions and orientations of the first and/or second optical sensor system on the device.

According to another embodiment of the invention, the first optical sensor system comprises a first optical sensor.

According to another embodiment of the invention, the second optical sensor system comprises a second optical sensor.

According to another embodiment of the invention, the first sensor system records at least a portion of at least one finger, and wherein the second sensor system records particularly only the object surface.

According to this embodiment the sensor fields, i.e. the areas where the sensor systems acquire sensor data from can overlap but can also be separated.

It is obvious that particularly the sensor system monitoring the at least one finger might monitor also the object surface, when for example the at least one finger touches the surface.

Particularly in case the first and the second sensor system are optical sensor systems, the separation of the sensor fields, particularly the separation of the field of views of the optical sensor systems, simplifies the estimation of the position and/or orientation of the at least one finger with respect to the object surface, as an a priori knowledge regarding the separated sensor fields can be used by the machine learning method.

Moreover, the first and second sensor system can be different kinds of particularly optical sensor systems, which allows for the generation of dedicated sensor data that is particularly suited for the specific task—either acquiring particularly optical sensor data from the object surface for estimating the position and/or orientation of the object surface relative to the device, or acquiring particularly optical sensor data comprising at least the portion of the at least one finger for estimating the position and/or orientation of the at least one finger with respect to the device. The combined information allows for the estimation of the position and/or orientation of the at least one finger with respect to the object surface.

The second sensor system is particularly configured to provide sensor data that allows for identifying a position and orientation of the device over the object surface.

This embodiment particularly allows for determining the position and orientation of the device with respect to the object surface without specific markers arranged on the object surface designed for providing a frame of reference to the device.

Depending on where the first and the second sensor system are arranged on the device, it might not be possible for the first sensor system to record the at least one finger completely, but only a portion.

It is particularly important to record at least the fingertip portion of the at least one finger, i.e. the distal phalanx and/or the proximal phalanx with the first sensor system, for the reason explained above. According to another embodiment of the invention, the object surface is located in the half-space extending away from a palm of a hand wearing the device, particularly wherein the predefined distance of the device to the object surface is less than 20 cm, particularly less than 10 cm.

The half-space extending away from the palm is to be understood in the context of a complementary half-space extending away from the back of the hand wearing the device.

The half-space therefore depends on the orientation of the hand wearing the device. Typically, the object surface, such as a tabletop or a body part is arranged such that a posture of the hand is physiological, which allows for a convenient use of the device.

For example, when the person wearing the device puts the hand with the device on the object surface, e.g. a tabletop or a body part, the hand experiences a support from the object surface, which allows for a natural hand posture, which in turn enables a fatigue-free working with the device.

The sensor system recording the object surface can be optimized for recording at distances below 20 cm.

According to another embodiment of the invention, the hand wearing the device rests on the object surface, particularly with its wrist, particularly wherein the object surface is arranged under the palm of the hand.

Particularly when the hand rests on the object surface, the object surface is within the predefined distance to the device.

According to another embodiment of the invention, the sensor data comprise data (IMU-data) from an inertial measurement unit (IMU) arranged on the device. The IMU can be a sensor system, particularly the second sensor system. The IMU-data can be used for complementing sensor data from other sensor systems.

As IMUs can generate IMU-data at high rates, e.g. at 1600 Hz and higher, the IMU-data can be used for fast evaluation of fast or instant motions of the at least one finger or the hand, including when the finger hits objects such as the object surface.

The IMU-data are particularly useful for estimating the position and/or orientation of the device with respect to the surface.

According to another embodiment of the invention, the machine learning method comprises at least one artificial neural network trained and configured to estimate the position and/or orientation of the at least one finger with respect to the object surface, particularly from the sensor data recorded by the first and the second sensor system, and particularly from the IMU.

Artificial neural networks (ANN) are a class of machine learning methods inspired by the biological neural networks that constitute human or animal brains. An ANN consists of a plurality of simple processing units, the so-called neurons, which communicate by transmitting signals to each other over a large number of weighted connections between the neurons. ANNs are inherently parallel in the sense that many neurons can carry out their computations simultaneously. This makes them very suitable for fast execution on highly parallelized processing hardware such as field programmable gate arrays (FPGA) or vector-processing digital signal processors (DSP). The method according to the invention can comprise a plurality of ANNs connected in serial or parallel order.

The at least one ANN can learn during regular use of the device, i.e. during execution of the method or when the energy source is being charged. The learn feature can be adapted, for example by means of a software interface with the device. The user can adjust, store or delete parameters including for learning on the external computer and send the configuration to the device using such software interface.

This way, the device can also be used by a plurality of users, wherein the at least one ANN is particularly trained for each user.

According to another embodiment of the invention, the ANN estimates an intermediate result for the position of the at least one finger with respect to the device. For example, an ANN can calculate the probability that a finger touches the object surface. This information along with sensor data is fed in a following ANN that decides whether the user completed a gesture such as a mouse click. Additional parameters sent from the external computer can be fed into an ANN. These parameters can be adjusted by the user or by the operating system on the external computer. One of the parameters for example determines the scale of the coordinate system of the position of fingers.

The at least one ANN can contain recurrent neural networks to consider e.g. the movement of the fingers over time.

The parameters of ANN can be pruned: Parameters that do not contribute significantly to the output of the ANN are removed. This saves memory space, lowers execution time and thus lowers power consumption.

According to another embodiment of the invention, positions and/or orientations of a plurality of fingers of the hand wearing the device, particularly positions and/or orientations of all fingers of the hand, are estimated by the machine learning method.

This allows for a more detailed gesture recognition in downstream processing methods. Furthermore, keyboard typing on the object surface can be facilitated, even without a physical keyboard present, by estimating the positions, and particularly the touching points of the fingers on the object surface.

According to another embodiment of the invention, the external computer provides predictive data to the machine learning method, the predictive data comprising position and orientation probabilities for the at least one finger for positions and/or orientations that are expected to be adopted.

Predictive data can be estimated by the external computer for example based on previous positions and/or orientations of the at least one finger.

The use of predictive data for example allows constraining the user input to a limited set of display positions and/or orientations on the display. This becomes particularly handy, when for example a modal dialog is displayed on the display and the user has to choose between a selected set of options, these options can be depicted as buttons. With the locations of the buttons on the display known, the computer can provide predictive data that reflect the positions of the buttons, such that the position estimation of the at least one finger under the constraint of the predictive data is computational less expensive, more precise and the user accomplishes his intention faster.

Also, frequent patterns in motion of the at least one finger can be used to generate predictive data in order to recognize these frequent patterns of motion faster and computationally less expensive, even though a specific motion pattern might not have been executed to full extent.

Thus, predictive data can comprise constraints derived from the displayed content on the screen or the predictive data can reflect a likelihood of a future position of the at least one finger based in historic data.

The historic data and frequent patterns of motion can be stored on the device in order to reduce bandwidth and increase processing speed, precision and fidelity of the estimation.

Historic data, frequent patterns and predictive data can also be used when some sensor data are partially corrupt or degraded. This can happen when for example the user covers an optical sensor with a finger or dirt on the optical sensor degrades the sensor data.

According to another embodiment of the invention, from a plurality of estimated positions and/or orientations of the at least one finger a predefined gesture of the at least one finger is estimated, wherein the external computer executes for each estimated gesture an associated gesture method, wherein the predefined gesture method is particularly a pinch-to-zoom, a pan and/or a swipe gesture method.

The plurality of estimated positions and/or orientations of the at least one finger is for example a series of consecutive positions and/or orientations of the at least one finger.

From such a plurality of positions and/or orientations a motion of the hand and the at least one finger can be estimated. From this motion a gesture can be estimated.

In turn, the gesture can be associated with a predefined command or a dedicated gesture method in order to control the external computer.

A gesture in the context of the specification particularly refers to a predefined movement of the at least one finger or the hand wearing the device.

Popular gestures are for example the swipe gesture for moving a virtual swipe button. The swipe gesture is associated to a swiping motion of the hand and/or the at least one finger.

Also, the pinch-to-zoom gesture, where the thumb and an opposing finger, such as the index finger perform a pinching motion that is often associated to a zoom method for magnifying a virtual object displayed on the display, can have a predefined gesture method associated to it.

A gesture method in the context of the present specification comprises particularly a computer program that is executed upon detection of the predefined gesture.

The predefined gesture is particularly estimated on the device, particularly by the processor or by the external computer.

According to another embodiment of the invention, the device can be activated or deactivated with a gesture. Examples of such a gesture are:
  a) At least one finger hits at least once the object surface;
  b) The tip of the thumb hits the device or the finger wearing the device;
  c) The hand that wears the device rotates around its wrist along the axis parallel to its radius;
  d) A particular finger flexes its fingertip to touch or nearly touch the palm of the its hand;
  e) The hand wearing the device moves away from the object surface, in particular to a minimal distance of e.g. 10 cm;

Gestures can be detected with threshold values, such as a minimal distance in e). Additionally, the movement pattern can be taken into account. Parameters such as thresholds or movement patterns can be defined on the external computer by the user and sent to device. The device can adapt the values of those parameters depending on the context. For example, when the device is located over a physical keyboard, the minimal distance of the device to the object surface to deactivate the device is 5 cm instead of 10 cm.

The device or the external computer can activate or deactivate the device depending on the activity of the user. For example, when the user does not use the device for any command on the external computer for more than one minute, the device deactivates. Other examples are when the user leaves his work place or when the hand wearing the device approaches a physical keyboard. Further, the user can define a volume attached to an object surface in which the device is active and as soon as the device leaves this volume, the device deactivates. The device and/or the external computer can learn from user activity when the user typically activates or deactivates the device, for example when the user performs a movement pattern with his fingers.

The user or the external computer can switch to a text input mode. Optionally in this mode, a virtual keyboard can be shown on the display and the position of at least one finger can be indicated on the display, for example with the method described in EP3143478. In this mode, the external computer can suggest text expressions to the user according to the completed input of the user. Such technology has been widely adopted in smartphones and is known as "word completion" or "autocompletion". In addition to this technology, the device or the external computer adapts the suggestions based on the movement of at least one finger, even before the user hits a virtual key. For example, when the user starts extending his middle finger of the right hand, the most likely key the user wants to press is T. This probability can be considered in the suggestions for text expressions.

The indicator of the position of a finger on the display can also move when the corresponding fingertip is fixed on the object surface but the proximal interphalangeal joint moves radial or ulnar. This radial or ulnar movement of the proximal interphalangeal joint can also trigger events such as zooming an area of the display, preferably proportional to the movement of the joint.

The device, the external computer and/or the display can measure properties of the ambient light, including the wavelengths, energies and/or directions of different light sources. This information of ambient light can be stored on the external computer and the user can change measured information about the ambient light or add additional information about the ambient light. All this information about the ambient light can be considered for the graphical appearance of objects and indicators of fingers (as for example described in EP3143478) on the display. For example, when only one light source right above the user and display is present, a shadow below the indicated finger on the display is graphically shown on the display. Shadows of objects or indicators of fingers on the display adapt to the ambient light of the user and provide a natural, virtual environment.

According to another embodiment of the invention, the method is executed with a device according to the embodiments in the specification.

The problem addressed by the invention is furthermore solved by a computer program comprising instructions which, when the computer program is executed by a computer or by a processor, cause the computer or the processor to carry out the method according to the invention.

The computer program is particularly executed on the processor of the device.

The problem addressed by the invention is also solved by a computer program product comprising a computer program according to the invention, wherein the computer program product comprises a computer-readable medium having stored the computer program in a non-transitory fashion.

The problem addressed by the invention is also solved by a device for human-machine interactions wherein the device is a finger-worn device such as a finger ring, particularly wherein the device is configured to be worn while a hand wearing the device rests on an object surface, the device comprising, particularly housing, or enclosing at least the following components:
- an energy source for providing the components of the device with electric energy;
- a first sensor system and a second sensor system, wherein the first sensor system is configured and arranged to record sensor data for estimating a particularly three-dimensional position and/or a particularly three-dimensional orientation of at least one finger with respect to the device, wherein the second sensor system is configured and arranged to record sensor data for estimating a particularly three-dimensional position and/or a particularly three-dimensional orientation of the device relative to an object surface arranged on a palm side of the hand wearing the device;
- a processor configured and adapted to receive the sensor data from the first and the second sensor system and to estimate from the sensor data a position and/or an orientation of the at least one finger relative to the object surface;
- a transceiver for transmitting position data comprising the estimated position and/or orientation of the at least one finger with respect to the object surface to an external computer, and to receive configuration or predictive data from the external computer.

The features, terms, examples and embodiments of the method according to the invention apply to the device. Particularly the device-related features of the method according to the invention that are detailed in the context of the method apply to the device according to the invention. Also, features, terms, examples and embodiments relating to the device can be applied to the method according to the invention, particularly when they are method-related.

As explained above, the device is a finger-worn device, which means that the device has dimensions and a weight that still allows the device to be worn particularly on a single finger. Furthermore, the device is particularly attachable to at least one finger, such that the device remains attached to the finger. For this reason the device particularly comprises a dedicated means, such as a clasp and/or a strap that are configured to attach the device to a finger.

The device is particularly formed as a finger ring. The finger ring can be formed as a decorative ring, comprising the abovelisted components inside or on its body.

According to another embodiment of the invention, the device has the form of a finger ring or a partial finger ring.

According to this embodiment, the device comprises particularly a ring-shaped portion, wherein an inner diameter of the ring-shaped portion corresponds or is adjustable to the diameter of a human finger.

According to another embodiment of the invention, the device comprises a surface that comprises gold, silver, a ceramic and/or another commonly used material that is used for decorative finger rings.

In contrast to other devices known in the art, the finger-worn device advantageously solves the problem that a sensor field for estimating a finger position and/or finger orientation with respect to the object surface, particularly of the finger wearing the device is never obstructed for example by other parts of a hand such as the wrist or the palm. Additionally, the device solves the problem of limited space for the components it houses particularly by the specific arrangement of the first and the second sensor system and/or by provision of a suitable processor.

According to another embodiment of the invention, the device comprises an antenna, particularly a Bluetooth antenna arranged in or on the device, wherein the antenna is particularly arranged in a slit of the device that is not covered with a shielding component, such as a metal housing.

Conventional computer mice are not configured to be finger-worn.

A human-machine interaction is particularly an interaction between a person and a computer or computerized device, wherein the interaction comprises an action of the person, such as a motion of a finger that is translated to a computer-readable command for the computer or the computerized device.

The energy source is particularly a battery, a rechargeable battery or a supercapacitor.

According to an embodiment of the invention, the device comprises a solar-cell and/or a thermo-electric generator arranged for charging the energy source.

This allows for recharging the device during use and independently of additional, particularly external charging devices, such as plugs, cables etc.

According to another embodiment of the invention, the device comprises a near-field charging device for charging the energy source, wherein the charging device is configured to gain its energy from a surrounding electro-magnetic field that is particularly provided by a dedicated charging station generating said electro-magnetic field. The receiver coil that transforms the electromagnetic field into a current can be integrated into a printed circuit board (PCB) comprised by the device.

The device further comprises a first sensor system and a second sensor system.

The position and the orientation are particularly estimated with 3 degrees of freedom each.

The first sensor system is particularly arranged to estimate the position and/or the orientation of a plurality of fingers with respect to the device. From the position and orientation of the at least one finger also information on the position and/or orientation of the hand can be estimated.

The device can be configured to be worn on different fingers. The device is particularly configured to estimate the position and/or orientation of at least the finger on which it is worn.

The device is particularly configured for the estimation of the position of the object surface when the object surface is arranged within a predefined distance of the device, wherein the predefined distance is the distance between the object surface and the device, when the hand wearing the device rests on the object surface, particularly wherein the object surface is arranged under the hand wearing the device, particularly wherein the predefined distance is smaller than 20 cm, particularly smaller than 10 cm.

The first and/or the second sensor system can comprise an optical sensor, such as a camera, a radio sensor, a radar sensor, or a sound sensor.

According to another embodiment of the invention, the device comprises a radio sensor that is configured and arranged for estimating a distance to an external radio device such as a Bluetooth transceiver, wherein the radio sensor is configured to estimate the distance based on the signals provided by the external device.

For the distance estimation an Impulse Radio UWB-based transceiver can be used that for example uses the upper UWB bands from 6 GHz to 8 GHz.

According to another embodiment of the invention, the device comprises an antenna, wherein the antenna is arranged on a surface of the device. The antenna is particularly a printed circuit board arranged in the surface of the device.

The processor is particularly a microprocessor.

The processor needs to be configured to estimate the position and/or orientation of the at least one finger based on the sensor data provided from the first and the second sensor system. This task has furthermore to be achieved in a comparably energy-efficient manner in order to sustain a reasonable operating time for the device. Moreover, the task of estimating the position and/or orientation of the at least one finger with respect to the object surface has to be executed quickly in order to facilitate a real-time performance of the device.

Thus, not all processors known in the state of the art are suitable.

For example processors such as ARM M4 and ARM M7 are state of the art. These processors do not have the performance to handle sensor data such as images with reasonable resolution and additional sensor data with an update rate of 30 Hz to 240 Hz on a power budget of an energy source that fits into the device.

As of today, only dedicated processors that comprise several processing cores, a specialized hardware for hosting and calculating artificial neural networks including convolutions and exhibiting an ultra-low-power consumption can handle the sensor data in an acceptable power envelope for wearables such as the device. These dedicated processors require only about ⅙th to ¼sth of the energy consumed by ARM M7. A dedicated processor is for example the GAP8 from Green Waves Technologies (https://greenwaves-technologies.com), located in Pépiniére Bergès, av. des Papeteries, office #6, 38190 Villard-Bonnot, France.

One of the most distinctive features for the processor suitable for the device according to the invention is the handling of the cache of the processor. The cache handling is at least partially implemented in hardware. For example, for convolutions, all weights remain in the cache and additionally all the input data of a particular area, as elaborated previously in the specification.

Moreover, the processor of the device is particularly configured to perform a plurality of calculations within the same clock cycle.

Furthermore, the processor of the device is particularly configured for the efficient and fast execution of Fast Fourier Transforms (FFT) or ANNs, such as the fast execution of convolutions required for the execution of layers in the ANN.

At the same time the processor is optimized for low energy consumption. Examples for such processors are the integrated circuits (IC) from Movidius or the PULP platform (www.pulp-platform.org).

According to another embodiment of the invention, the processor is adapted to be adjusted in its clock speed, wherein the clock speed is particularly adjusted to the rate of an image transition from the first and/or the second sensor system to a memory storage of the processor or the device, such that only when sensor data are available to the processor, i.e. stored on the memory storage, a new processing cycle is initiated. This allows for an energy-efficient processing and for a low latency between movement of the at least one finger and the indication of the display position and/or the display orientation on the display.

The transceiver is particularly the radio sensor for distance estimation.

According to another embodiment of the invention, the first optical sensor is arranged and/or oriented such on the device that data from a first sensor field, particularly a first field of view are acquired and wherein the second optical sensor system is arranged and/or oriented such on the device that sensor data from a second sensor field, particularly a second field of view are acquired.

The term "first sensor field" and "second sensor field" particularly refer to a solid angle, an area or a volume within which the corresponding sensor system is configured to acquire sensor data from.

According to another embodiment of the invention, the first and the second sensor field cover substantially different sensor fields.

According to another embodiment of the invention, the first and the second sensor field are substantially non-overlapping.

According to another embodiment of the invention, the second sensor field comprises particularly only the object surface. The specific arrangements of the first and the second sensor system disclosed above particularly allow for miniaturizing the device such that it can be finger-worn. Particularly the provision of a 3D-camera is problematic with respect to the limited housing space of the finger-worn device.

According to another embodiment of the invention, the first sensor system is an optical sensor system particularly comprising a first optical sensor for acquiring optical sensor data, and/or wherein the second sensor system is an optical sensor system particularly comprising a second optical sensor for acquiring optical sensor data.

According to another embodiment of the invention, the device is configured to estimate a relative position and/or orientation with respect to the object surface particularly on an object surface that is devoid of additionally provided optical markers on the surface for providing the sensor system with a frame of reference with respect to the object surface.

The object surface therefore particularly does not require to comprise for example an additional sticker or other optical features that specifically serve the purpose of providing a frame of reference of the sensor system. The optical sensor system records light and generates sensor data from the recorded light. The term "light" refers particularly to the portion of the electro-magnetic spectrum comprising ultra-violet, visible and infrared radiation, particularly within the wavelength range of 200 nm to 2000 nm. For this purpose the device can comprise a light source, such as a light emitting diode (LED), and/or a light source configured to emit coherent or temporally and/or spatially modulated light, wherein the device is particularly configured such that the emission of the light source is synchronized with the sensor data acquisition of the sensors.

According to another embodiment of the invention, the device comprises an inertial measurement unit (IMU) for recording IMU-data particularly for estimating a position and/or an orientation of the device in space.

The IMU provides sensor data at comparably high rates, i.e. in the range between 10 Hz to 5000 Hz, particularly 1600 Hz, which allows for additional estimation of finger and/or hand movement while the sensor data are acquired and evaluated, particularly at a lower rate.

According to another embodiment of the invention, the first sensor system is or comprises a 3D-camera and/or wherein the second sensor system is or comprises a 3D-camera.

According to another embodiment of the invention, only one of the first or the second sensor system is part of a 3D-camera.

With 3D-cameras it is straightforwardly possible to achieve sensor data suitable for estimation of a three-dimensional position and/or orientation of the at least one finger or the device with respect to the object surface.

With 3D-cameras it is particularly simple to detect when the at least one finger touches the surface.

A 3D-camera particularly comprises optical components that allow for imaging the surrounding in a three-dimensional fashion, i.e. the optical sensor data comprise an information for each image point that allows for a three-dimensional position estimation of the point.

The 3D-camera particularly comprises two sensor arrays or two sensor array portions that are arranged laterally shifted with respect to each other and wherein a lens is arranged in front of each sensor array or each sensor array portion such that the surroundings are recorded twice, but with laterally shifted viewpoints.

The 3D-camera can be a time-of-flight camera.

According to another embodiment of the invention, the first optical sensor system comprises a sensor array of pixels configured to record a portion of the at least one finger, particularly a portion of a plurality of fingers, particularly the index or the finger wearing the device and the thumb.

An array-based optical sensor can acquire spatial information of the surroundings. The sensor array is adjusted such that its field of view comprises (when worn according to the invention) the at least one finger or at least a portion of the at least one finger, such that the position and/or the orientation of the at least one finger can be estimated by the machine learning method.

According to another embodiment of the invention, the first optical sensor system and/or particularly the second optical sensor system comprises an optical component arranged in front of the sensor array, wherein the sensor array is configured and arranged for recording light entering through the optical component and for generating the optical data, particularly wherein the optical component is arranged in a wall portion of the device, the optical component being one of:
  a) a lens or a plurality of lenses arranged and configured to project an image of the surroundings of the device onto the sensor array;
  b) a microlens array arranged and configured to project a plurality of images onto the sensor array;
  c) a coded aperture;
  d) a diffractive grating; or
  e) a diffusor.

In option a) the optical sensor system is particularly a conventional imaging system with at least one imaging lens, particularly three imaging lenses that are arranged on the device such that it can record the at least one finger. Subsequent image analysis is performed by the machine learning method, particularly by a trained ANN or by a plurality of ANNs.

Alternatively, as disclosed in option b), the optical component is a microlens-array such as for example disclosed in [1].

The microlens array is particularly arranged on the optical sensor, i.e. the sensor array of the first optical sensor system. The microlens array is arranged such on the sensor array that each lens of the microlens array images only a portion of the field of view onto a portion of the sensor array. With the microlens array a plurality of apertures are provided and thus a plurality of images comprising a sector of the field of view. The advantage of a microlens array over conventional single aperture imaging, as with a single lens in alternative a), is that the first optical sensor system requires less space, i.e. the sensor system can be built more compact and lightweight. The potential lower optical resolution compared to a single imaging lens optic can be compensated with a bigger sensor array without increasing the height of the camera.

The plurality of images generated by the microlens array can be processed for example either separately by the machine learning method or after an assembly step that assembles the plurality of images to a single image that is then processed by the machine learning method.

According to alternative c) of this embodiment, the optical component is a coded aperture. The coded aperture can be arranged closer to the optical sensor array as a single lens for imaging, which allows for a more compact geometry of the optical sensor system. Coded apertures require image reconstruction. Efficient reconstruction methods are for example known from [2]. Coded apertures allow for a comparably high light throughput. The coded aperture can be combined with a microlens array in order to adjust the coded apertures to the task of estimating the at least one finger position and/or orientation.

According to alternative d) of this embodiment, a diffractive grating is arranged in front of the sensor array. The diffractive grating can be adjusted and optimized for the task of providing optical sensor data for estimation of the at least one finger position or orientation, as disclosed in [3].

According to alternative e) of this embodiment, the optical component is a diffusor arranged in front of the sensor array. While no classical image formation takes place with a diffusor as a "lens", it is possible to reconstruct a three-dimensional image from the light hitting the sensor array by solving a large scale inverse problem (see e.g. [4]).

The diffusor can comprise an infrared filter in order to filter infrared light.

The optical sensor system with a diffusor exhibits a lower F-number (i.e. a larger aperture) as compared to a lens-based optical sensor system or coded aperture optical sensor systems.

The integration of a diffusor is comparable simple with respect to a curved surface, of ring-shaped device according to the invention.

Furthermore, the diffusor does not require a specific alignment with the sensor array. The diffusor allows reconstruction of a three-dimensional image and thus the three-dimensional estimation of the position and/or the orientation of the at least one finger, without any additional imaging components, illumination means or illumination patterns.

The diffusor-based optical sensor system is particularly suited for imaging at distances between 1 cm to 10 cm and also provides information about the distance of objects in this range which are typical distances of the device to the at least one finger.

The at least one finger covers a particularly large and connected area of the "image" on the sensor array, which can be used for reducing the computational load on the processor.

The diffusor does not need to be planar but can be curved and exhibit a varying thickness such that the diffusor can be integrated in the device at arbitrary surface portions.

The sensor data from the sensor array do not necessarily need to be reconstructed to conventional images but can be processed directly with the machine learning method, particularly with the ANN, in order to estimate the position and/or orientation of the at least one finger with respect to the device or the object surface.

For this purpose; particularly different point spread functions (PSF) can be measured particularly during the production process for each device and stored individually in each device. The PSF can be measured at different distances and positions to the image sensor.

Besides recent sensor data such as an image or IMU data, these PSF particularly serve as input to ANNs. Depending on the previous state such as the position of the fingertips or the distance to an object surface, different sets of PSF can be feed into ANNs. This can increase the resolution e.g. around the current position of fingertips, reduces significantly the calculation cost and can increase the robustness of algorithms. These PSF can also be used to train an ANN during production and store these ANN individually in each device.

According to another embodiment of the invention, at least one lens is arranged before or after the diffusor.

According to another embodiment of the invention, at least one surface of the lens is configured to diffuse incident light such that the lens comprises the diffusor. The lens can for example widen the field of view, deviate the optical axis, form a non-circular view like an elliptic view, serve as scratch protection of the diffusor, add anti-reflection coating and/or integrate an aperture with a coating of rectangular or elliptic shape.

For reconstructing a conventional image, the diffused image can be transformed to a known domain such space, frequency, discrete cosines or wavelets but also to domains that optimize the sparsity of the signal with respect to e.g. finger tips or wrinkles of the fingers. To further improve the sparsity in a transformed domain, the form of the projected pattern on the image sensor by the diffusor can also be optimized for e.g. the form and size of finger tips or wrinkles of the fingers.

According to another embodiment of the invention, the diffusor is curved and arranged in a wall portion of the device.

According to another embodiment of the invention, the first and/or second optical sensor system comprises or is an optical sensor, such as a time-of-flight sensor, wherein the optical sensor is configured and arranged to estimate a distance of the device to the object surface and a lateral position of the device relative to the surface.

Such sensors allow for robust estimation of a three-dimensional position and/or orientation of the device with respect to the object surface.

The second optical sensor system is particularly configured to estimate a two-dimensional position of the device relative to the object surface. For this task conventional sensors and processes can be used to compare images with a 2D-correlation method, in particular when the coherent light of a vertical-cavity surface-emitting laser (VCSEL) projects speckles on the object surface.

A suitable sensor is for example a VCSEL with an integrated photodiode that is configured to measure the distance and the velocity of the sensor system relative to the object surface based on the Doppler-effect [5]. A plurality of such sensors can detect the movement and orientation in several dimensions.

Alternatively, an optical sensor as used in a conventional computer mouse can be used for estimating a two dimensional position relative to the object surface.

The distance between the device and the object surface can be estimated by optical triangulation, with the Doppler-effect or with a time-of-flight sensor.

According to another embodiment of the invention, the device comprises a light source for illuminating the at least one finger and/or the object surface.

This embodiment allows for using the device in low-light conditions.

According to another embodiment the display comprises the external computer.

According to another embodiment of the invention, the device comprises a computer-readable memory storage comprising or particularly having stored on it the computer program according to the invention, wherein computer-readable memory storage is configured to provide the computer program to the processor such that the processor executes or can execute the computer program.

The problem addressed by the invention is furthermore solved by a system comprising a finger-worn device according to the invention, an external computer and a communication device configured to receive data from the finger-worn device and provide the received data to the external computer and to send computer data to the finger-worn device.

The term "computerized device" or a computerized system or a similar term denotes an apparatus comprising one or more processors operable or operating according to one or more programs.

The terms 'computer' or "computerized device", or a system thereof, are used herein as ordinary context of the art, such as a computer comprising a general purpose processor or a micro-processor, RISC processor, or DSP, possibly comprising additional elements such as memory or communication ports. Optionally or additionally, the term 'computer' or derivatives thereof denote an apparatus that is capable of carrying out a provided or an incorporated program and/or is capable of controlling and/or accessing data storage apparatus and/or other apparatus such as input and output ports. The term 'computer' denotes also a plurality of computers connected, and/or linked and/or otherwise communicating, possibly sharing one or more other resources such as a memory.

The terms 'software', 'program', 'computer program' may be used interchangeably according to the context thereof, and denote one or more instructions or directives or circuitry for performing a sequence of operations that generally represent an algorithm and/or other process or method. The program is particularly stored in or on a medium such as RAM, ROM, or disk, or embedded in a circuitry accessible and executable by an apparatus such as a processor or other circuitry.

The computer and the program may constitute the same apparatus, at least partially, such as an array of electronic gates, such as FPGA or ASIC, designed to perform a programmed sequence of operations, optionally comprising or linked with a processor or other circuitry.

As used herein, a module particularly represents a part of a system, such as a part of a program operating or interacting with one or more other parts on the same unit or on a different unit, or an electronic component or assembly for interacting with one or more other components.

As used herein, a process particularly represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In the context of embodiments of the present disclosure, by way of example terms such as 'operating' or 'executing' imply also capabilities, such as 'operable' or 'executable', respectively.

According to another embodiment of the invention the method according to the invention is executed with a device according to the invention.

In the following the invention is detailed by means of exemplary embodiments and examples. The features from the exemplary embodiments and the examples can be combined in any technically meaningful way. It is shown in FIG. 1 a finger-worn device according to the invention.

Figure 1:
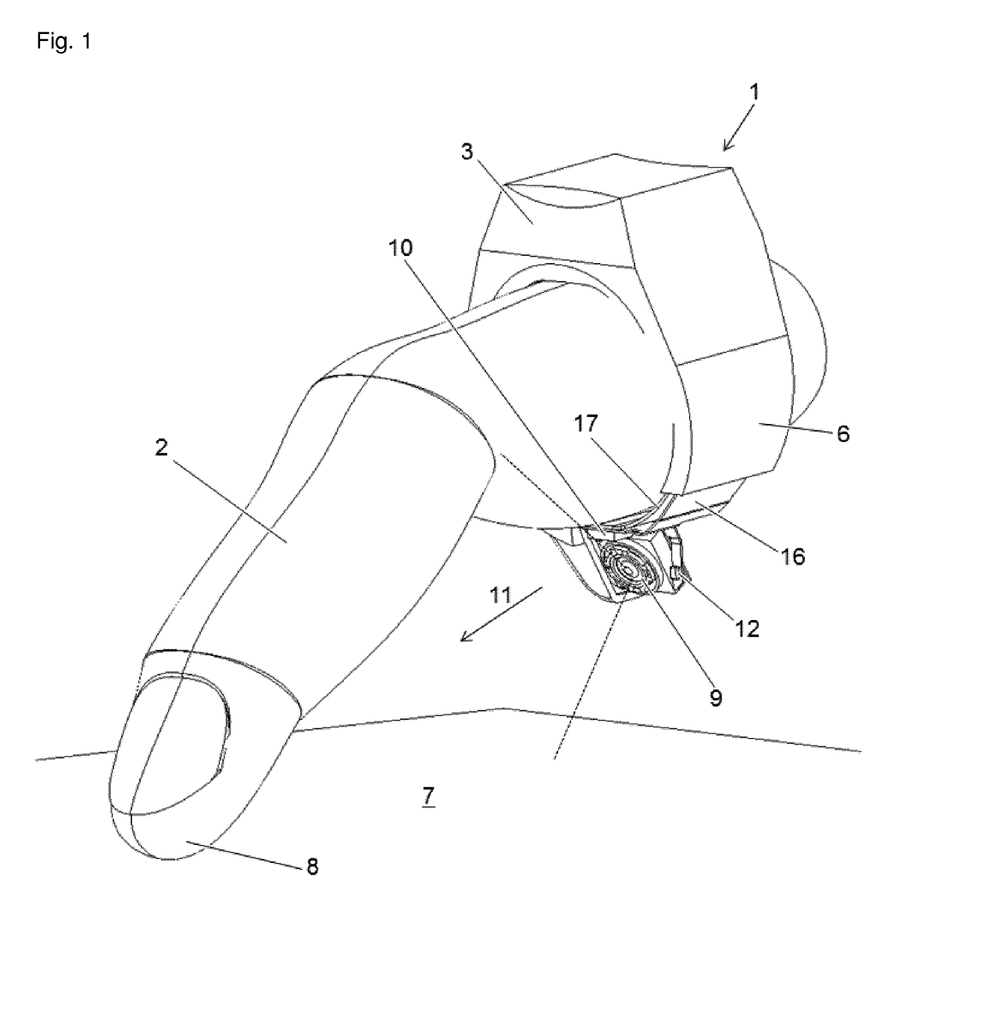

In FIG. 1 a perspective view of the device according to the invention is shown. The device 1 is ring-shaped and worn on the index finger 2 of a user of the device 1.

The top portion of the device 1 comprises a housing 3 that is formed in an ornamental fashion, such that the device 1 can be worn discreetly without being immediately recognized as a technological device 1. The housing 3 can comprise the processor 4 (see FIG. 2) and the energy source 5 (see FIG. 2) for the electric components of the device 1.

The device 1 comprises a shell 6 comprising the housing 3 that is molded in a silicone mold and is made from ultraviolet-light cured plastics or from two-component plastics. Additionally, the housing can be partially 3D printed according to the preferences of the user, also at the point of sales.

The device 1 encloses the finger 2 circumferentially as conventional rings do.

The finger 2 and thus the hand (not shown) touches an object surface 7 with the fingertip 8. The object surface 7 in this example is a planar and solid tabletop surface arranged parallel to the palm of the hand in a half-space below the palm of the hand, as can be derived from the finger posture.

On a portion of the device that is arranged between the finger 2 and the object surface 7, a first sensor system 9 and a second sensor system 10 are arranged.

The first sensor system 9 is an optical sensor system that is a lens-based imaging system with a sensor-array, i.e. an imaging camera. The first optical sensor system 9 is arranged and positioned on the device 1 such that the fingertip 8 and a portion of the finger 2 wearing the device 1 are within the field of view (as indicated with the dotted lines) of the first optical sensor system 9.

For this purpose, the first sensor system 9 faces with its optical axis essentially along the direction 11 of the finger 2.

The first optical sensor system 9 records 300 (see FIG. 2) the portion of the finger 2 within its field of view and generates sensor data 201. In this case the sensor data 201 are digital image data. The digital image data allow for estimating a three-dimensional position and/or orientation of the finger 2 relative to the device 1.

In order to enable the device 1 to be used in the dark or in low-light environments, the device 1 comprises an LED 12 that is arranged next to the first optical sensor system 9. The LED 12 can provide light such that there is sufficient light to record 300 the finger 2 and/or the object surface 7. The LED 12 can comprise optical elements that allow for a structured illumination. The structured illumination can be used for evaluating a three-dimensional position and/or orientation of the finger 2 or the object surface 7 in downstream processing steps.

A second sensor system 10 is arranged on the device 1, wherein the second sensor system 10 is an optical sensor system comprising an optical sensor for recording 301 (see FIG. 2) the object surface 7. The optical sensor is arranged on the device 1 such that it essentially points towards the object surface 7 such that particularly only the object surface is recorded 301 by the second optical sensor system 10.

The light from the LED 12 can be used also for recording the object surface 7 with the second optical sensor system 10.

The second optical sensor system 10 generates optical sensor data 202 comprising information about the distance and the position of the device 1 relative to the object surface 7. Furthermore, the sensor data 202 from the second sensor system 10 can be used to evaluate an orientation of the device 1 relative to the object surface 7.

The device 1 comprises a processor 4 (not shown in FIG. 1) that is provided with the sensor data 201, 202 of the first and second sensor system 9, 10. The processor 4 comprises and executes a plurality of artificial neural networks 100 that are trained and configured to estimate 302 from the sensor data 201, 202 the position and/or the orientation of the finger 2 with respect to the object surface 7. For storing the artificial neural networks 100 the device 1 can comprise a computerized memory storage 13 (shown in FIG. 2).

Figure 2:
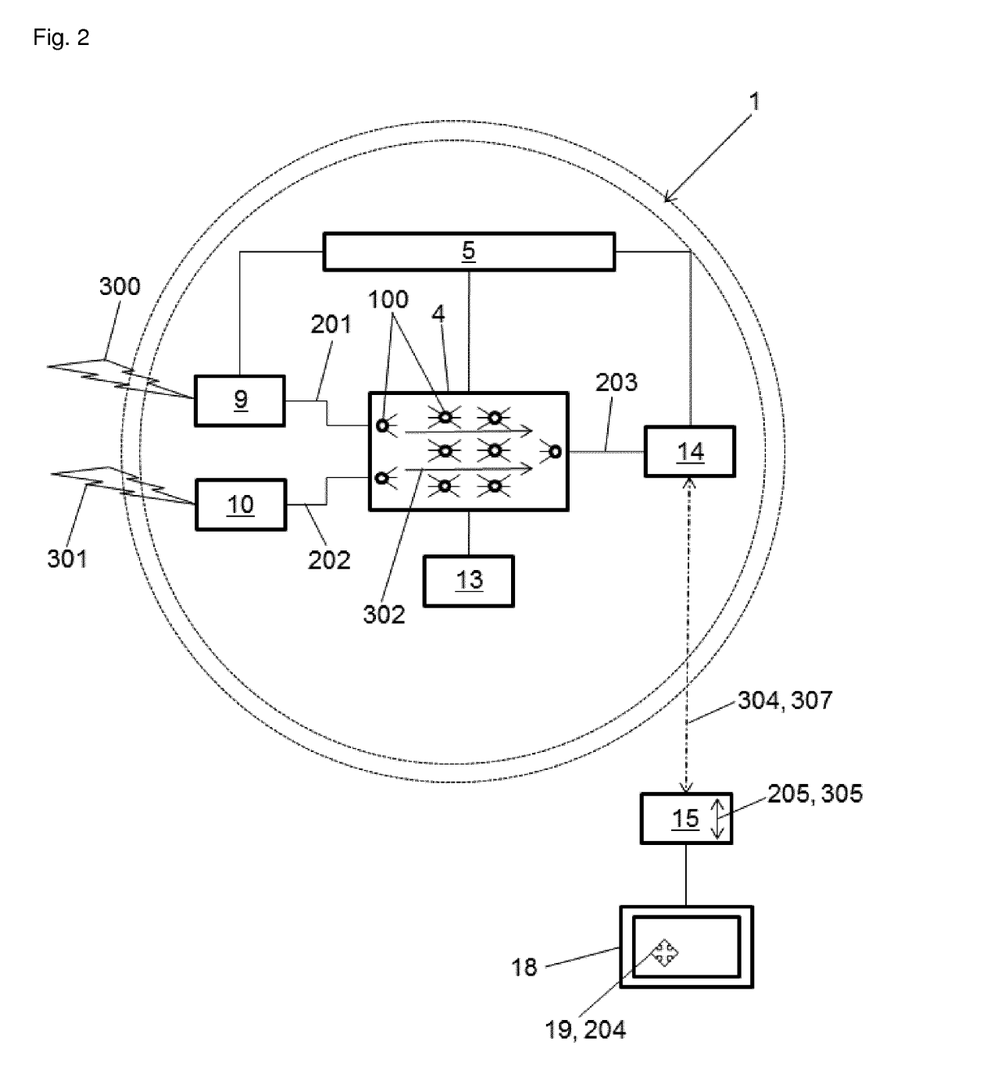
FIG. 2 a schematic flow diagram for the method according to the invention.

The estimated 302 position and/or orientation of the finger 2 relative to the object surface 7 is transmitted 304 in form of position data 203 by a transceiver 14 on the device 1 to an external computer 15 (shown in FIG. 2). The transceiver 14 comprises an antenna that is arranged on a printed circuit board 16 (PCB) that is partially exposed to the surrounding air such that electro-magnetic waves are not shielded by the device 1.

The PCB 16 is flexible such that it can conform to an inner ring portion 17 that conforms to the contour of the finger 1. The electronic and electrical components such as the first and the second sensor system 9, 10 as well as the processor 4 are electrically connected to the PCB 16.

With the device 1 the method according to the invention can be executed in real time such that the external computer 15 can be controlled by the device 1 in real time.

In FIG. 2 a schematic flow diagram of the method and the computer program according to the invention are shown.

After activating, initiating and pairing the device 1 (indicated as a dotted ring) with an external computer 15, sensor data 201, 202 from the first sensor system 9 and the second sensor system 10 are recorded, wherein the sensor data 201, 202 comprise the at least one finger 2 or a portion of the at least one finger 2 wearing the device 1 as well as the object surface 7. For this purpose, the first sensor system 9 records the finger 2 and the second sensor system 10 records the object surface 7.

From the sensor data 201, 202 a position and/or an orientation of the at least one finger 2 with respect to the object surface 7 is estimated 302, wherein the estimation 302 is performed by a plurality of artificial neural networks 100 executed on the processor 4 of the device 1. The ANNs 100 are configured to perform this task in real time.

The estimated position and/or the estimated orientation of the at least one finger 2 with respect to the object surface 7 is wirelessly transmitted 304 by a transceiver 14 in form of position data 203 to an external computer 15. The position data 203 are particularly digital data.

The external computer 15 receives the position data 203 and transforms and maps 305 the position data 203, e.g. by means of coordinate transformations, to a display position and/or to a display orientation 204 on a display 18 connected to the external computer 15. On the display 18 an indication of the display position and/or the display orientation 204 is shown for example in form of a cursor 19 positioned and oriented accordingly on the display or another optical feedback to the user of the device 1. When the finger 2 with the device is moved the display position and/or the display orientation 204 changes and is displayed accordingly.

Furthermore, the external computer 15 transmits 307 predictive data 205 and configuration data to the device 1. These external data are received by the transceiver 14 and processed accordingly by the device 1.

REFERENCES

[1] Fabrication of microoptical freeform arrays on wafer level for imaging applications, Dunkel et al, 2015, Optics Express Vol. 23, Issue 25, pp. 31915-31925.
[2] FlatCam: Thin, Bare-Sensor Cameras using Coded Aperture and Computation, Asif et al, 2016, Signal Processing Magazine IEEE, vol. 34, pp. 52-66.
[3] Optical, Mathematical, and Computational Foundations of Lensless Ultra-Miniature Diffractive Imagers and Sensors, Stork et al, 2014, International Journal on Advances in Systems and Measurements 7.3 (2014): 4.
[4] DiffuserCam: Lensless Single-exposure 3D Imaging, Antipa et al, 2017, Optica 5.1 (2018): 1-9.
[5] VCSEL based sensors for distance and velocity, Holger Moench et al, 2016, Vertical-Cavity Surface-Emitting Lasers XX. Vol. 9766. International Society for Optics and Photonics.

The invention claimed is:

1. Method for wireless interactions with an external computer with a finger-worn device (1) configured to acquire and transmit position data of at least one finger relative to an object surface to an external computer, wherein the method comprises the steps of:
particularly wearing the finger-worn device (1);
acquiring (300, 301) sensor data (201, 202) from a first sensor system (9) and a second sensor system (10) comprised in the device (1);
estimating (302) a position and/or an orientation of at least one finger (2) with respect to an object surface (7) from the sensor data (201, 202), wherein the estimation (302) of the position and/or the orientation of the at least one finger (2) with respect to the object surface (7) is performed by a machine learning method (100) executed on a processor (4) comprised by the device (1);
wirelessly transmitting (304) position data (203) comprising the estimated position and/or orientation of the at least one finger (2) with respect to the object surface (7) to an external computer (15);
relating (305) the estimated position and/or orientation of the at least one finger (2) with respect to the object surface (7) comprised in the position data (203) to a display position and/or a display orientation (204) in a coordinate system of a display (18);
indicating the display position and/or the display orientation (204) on the display (18).

2. Method according to claim 1, wherein the first sensor system (9) is an optical sensor system that records (300) optical data as sensor data (201), and/or wherein the second sensor system (10) is an optical sensor system that records (301) optical data as sensor data (202).

3. Method according to claim 1, wherein the first sensor system (9) records (300) at least a portion of at least one finger (2), and wherein the second sensor system records (301) the object surface (7).

4. Method according to claim 1, wherein the object surface (7) is located in the half-space extending away from a palm of a hand wearing the device (1).

5. Method according to claim 1, wherein the machine learning method (100) comprises at least one artificial neural network trained and configured to estimate the position and/or orientation of the at least one finger (2) with respect to the object surface (7), particularly from the sensor data (201, 202) recorded by the first and the second sensor system (9, 10).

6. Method according to claim 1, wherein positions and/or orientations of a plurality of fingers of the hand wearing the device (1), particularly positions and/or orientations of all fingers of the hand, are estimated by the machine learning method (100).

7. Method according to claim 1, wherein the external computer (15) provides (307) predictive data (205) to the machine learning method (100), the predictive data (205) comprising position and orientation probabilities for the at least one finger (2) for future positions and/or orientations of the at least one finger (2).

8. Method according to claim 1, wherein from a plurality of estimated positions and/or orientations of the at least one finger (2) a predefined gesture of the at least one finger (2) is estimated, wherein the external computer (15) executes for each estimated gesture an associated gesture method, wherein the predefined gesture method is particularly a pinch-to-zoom gesture method, a pan gesture method and/or a swipe gesture method.

9. Computer program comprising instructions which, when the computer program is executed by a computer, cause the computer to carry out the method according to claim 1.

10. A device for facilitating human-machine interactions, wherein the device (1) is a finger-worn device such as a finger-ring, the device comprising at least the following components (4, 9, 10, 12, 13, 14):
an energy source (5) for providing the components (4, 9, 10, 12, 13, 14) of the device (1) with electric energy;
a first sensor system (9) and a second sensor system (10), wherein the first sensor system (9) is configured and arranged to record (300) sensor data (201) for estimating a position and/or an orientation of at least one finger (2) with respect to the device (1), wherein the second sensor system (10) is configured and arranged to record (301) sensor data (202) for estimating a position and/or an orientation of the device (1) relative to an object surface (7) arranged on a palm side of the hand wearing the device (1);

a processor (4) configured and adapted to receive the sensor data (201, 202) from the first and the second sensor system (9, 10) and to estimate (302) from the sensor data (201, 202) a position and/or an orientation of the at least one finger (2) relative to the object surface (7);

a transceiver (14) for transmitting (304) position data (203) comprising the estimated (302) position and/or orientation of the at least one finger (2) with respect to the object surface (7) to an external computer (15).

11. Device according to claim 10, wherein the first senor system (9) is an optical sensor system for acquiring optical sensor data, and/or wherein the second sensor system (10) is an optical sensor system for acquiring optical sensor data.

12. Device according to claim 10, wherein the first optical sensor system comprises a sensor array configured to record a portion of the at least one finger (2), particularly a portion of a plurality of fingers, particularly the index and/or the thumb.

13. Device according to claim 12, wherein the first and/or the second optical sensor system comprises an optical component arranged in front of the sensor array, wherein the sensor array is configured and arranged for recording light entering through the optical component and for generating the optical sensor data (300), particularly wherein the optical component is arranged at a wall portion of the device (1), the optical component being one of:

a) a lens arranged and configured to project an image of the surroundings of the device (1) onto the sensor array;

b) a microlens-array arranged and configured to project a plurality of images onto the sensor array;

c) a coded aperture;

d) a diffractive grating; or e) a diffusor.

14. Device according to claim 12, wherein the first and/or the second optical sensor system (10) comprises or is an optical sensor, such as a time-of-flight sensor, wherein the sensor is configured and arranged to estimate a distance to the object surface (7) and a lateral position of the device (1) relative to the object surface (7).

15. Device according to claim 10, wherein the device (1) comprises a computer-readable memory storage (13) comprising the computer program according to claim 9, wherein computer-readable memory storage (13) is configured to provide the computer program to the processor (4) such that the processor (4) executes or can execute the computer program.

* * * * *